(12) United States Patent
Yang et al.

(10) Patent No.: US 12,115,911 B2
(45) Date of Patent: Oct. 15, 2024

(54) CENTRAL REARVIEW MIRROR

(71) Applicant: GUANGZHOU ISSYZONE TECHNOLOGY CO., LIMITED, Guangzhou (CN)

(72) Inventors: Taiping Yang, Guangzhou (CN); Ning Wang, Guangzhou (CN); Guoyuan Lin, Guangzhou (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 13 days.

(21) Appl. No.: 18/124,588

(22) Filed: Mar. 22, 2023

(65) Prior Publication Data
US 2024/0227672 A1   Jul. 11, 2024

(30) Foreign Application Priority Data
Jan. 9, 2023   (CN) .......................... 202320054217.5

(51) Int. Cl.
*B60R 1/04*   (2006.01)
(52) U.S. Cl.
CPC ..................................... *B60R 1/04* (2013.01)
(58) Field of Classification Search
CPC   B60R 1/04; B60R 1/1207; B60R 1/02; B60R 2011/0059
USPC ........................................................ 248/476
See application file for complete search history.

(56) References Cited

U.S. PATENT DOCUMENTS

| | | | | |
|---|---|---|---|---|
| 1,345,157 A | * | 6/1920 | Francisco ................. | B60R 1/04 248/479 |
| 1,628,218 A | * | 5/1927 | Beauchamp .............. | B60R 1/04 248/478 |
| 2,000,212 A | * | 5/1935 | Bradley .................... | B60R 1/04 359/838 |
| 6,000,823 A | * | 12/1999 | Desmond ............. | B60Q 1/2665 362/135 |
| 2006/0087857 A1 | * | 4/2006 | Liu ........................ | B60R 1/002 362/494 |
| 2018/0099617 A1 | * | 4/2018 | Hirota ....................... | B60R 7/06 |
| 2019/0263322 A1 | * | 8/2019 | Hayashi .................... | B60R 1/04 |

* cited by examiner

*Primary Examiner* — Christopher Garft
(74) *Attorney, Agent, or Firm* — Bayramoglu Law Offices LLC

(57) ABSTRACT

A central rearview mirror includes a profile-shaped mirror housing. The front of the mirror housing is provided with a first sliding chute, and a lens is slidably embedded in the first sliding chute. An end cover is removably installed at each of the two side ends of the mirror housing. The advantages of the central rearview mirror are as follows: The profile is adopted as the main body of the mirror housing, that is, the mirror housing is a solid straight bar with a certain cross-section shape so that each cross-section of the mirror housing is unified. When it is required to design central rearview mirrors of different lengths, it is only necessary to cut a large-length profile to obtain the mirror housing in the required length without tedious computer numerical control (CNC) processing or new mould-opening, thus reducing the production cost of the central rearview mirror.

7 Claims, 5 Drawing Sheets

CENTRAL REARVIEW MIRROR

CROSS REFERENCE TO THE RELATED APPLICATIONS

This application is based upon and claims priority to Chinese Patent Application No. 202320054217.5, filed on Jan. 9, 2023, the entire contents of which are incorporated herein by reference.

TECHNICAL FIELD

The present disclosure relates to the technical field of automobile rearview mirrors, particularly to a central rearview mirror.

BACKGROUND

An all-terrain vehicle (ATV), commonly known as a dune buggy, refers to a vehicle that can drive on any terrain and can run freely on terrain where it is difficult for ordinary vehicles to move. To enhance the safety performance of ATVs, the prior ATVs are increasingly equipped with vehicle frames to protect the occupant cabin as much as possible and prevent the vehicle from overturning and injuring the occupants. Therefore, the ATV with an outer frame is more similar to the family car in structure and needs to be equipped with a central rearview mirror in the vehicle (usually in the middle part of the vehicle frame) to achieve the basic driving rearview function.

The manufacturing process of the central rearview mirror of the prior ATV is similar to that of ordinary vehicles, which is basically computer numerical control (CNC) or injection molding. Products of different lengths and sizes require a CNC process or new mould-opening, resulting in high production costs.

SUMMARY

In view of the above problems, the present disclosure provides a central rearview mirror, which mainly solves the problem that the central rearview mirrors of different lengths and sizes require a CNC process or a new mould-opening.

To solve the above technical problem, the technical solutions of the present disclosure are as follows:

A central rearview mirror includes a profile-shaped mirror housing. The front of the mirror housing is provided with a first sliding chute, and a lens is slidably embedded in the first sliding chute. An end cover is removably installed at each of the two side ends of the mirror housing.

In some embodiments, at least one through hole is arranged at a side end of the mirror housing, and a side end of the end cover is provided with a fixed block configured to be inserted into the through hole.

In some embodiments, the fixed block is in a transition or an interference fit with the through hole.

In some embodiments, the surface of the fixed block is provided with a first fixed hole, and the back of the mirror housing is provided with a second fixed hole overlapped with the first fixed hole. The first fixed hole and the second fixed hole are removably locked by a first fastener.

In some embodiments, the first fastener is a bolt or a screw.

In some embodiments, the central rearview mirror further includes a pipe clamp, and an end of the pipe clamp is fixed with a connecting part. At least one removable second fastener is arranged on the surface of the connecting part. At least one second sliding chute is arranged on the back of the mirror housing, and the second fastener is slidably embedded in the second sliding chute.

In some embodiments, the second fastener includes a screw and a nut, and the nut is slidably embedded in the second sliding chute. The surface of the connecting part is provided with a third fixed hole. The screw passes through the third fixed hole and then is screwed with the nut.

In some embodiments, the inner wall of the first sliding chute is further fixed with a buffer pad, and the back of the lens is pressed against the front of the buffer pad.

In some embodiments, the bottom of the mirror housing is further provided with a third sliding chute, and a lamp strip is slidably embedded in the third sliding chute.

In some embodiments, the central rearview mirror further includes a profile-shaped lampshade, and two long edges of the lampshade are folded inward to form a fastening part. The inner wall of the third sliding chute is provided with a convex strip matched with the fastening part along a length direction of the third sliding chute, and the fastening part is slidably embedded in the third sliding chute along a length direction of the convex strip until the lampshade shields the lamp strip.

The advantages of the present disclosure are as follows: The profile is adopted as the main body of the mirror housing, that is, the mirror housing is a solid straight bar with a certain cross-section shape so that each cross-section of the mirror housing is unified. When it is required to design central rearview mirrors of different lengths, it is only necessary to cut a large-length profile to obtain the mirror housing in the required length without tedious CNC processing or new mould-opening, thus reducing the production cost of the central rearview mirror.

Figure 1:
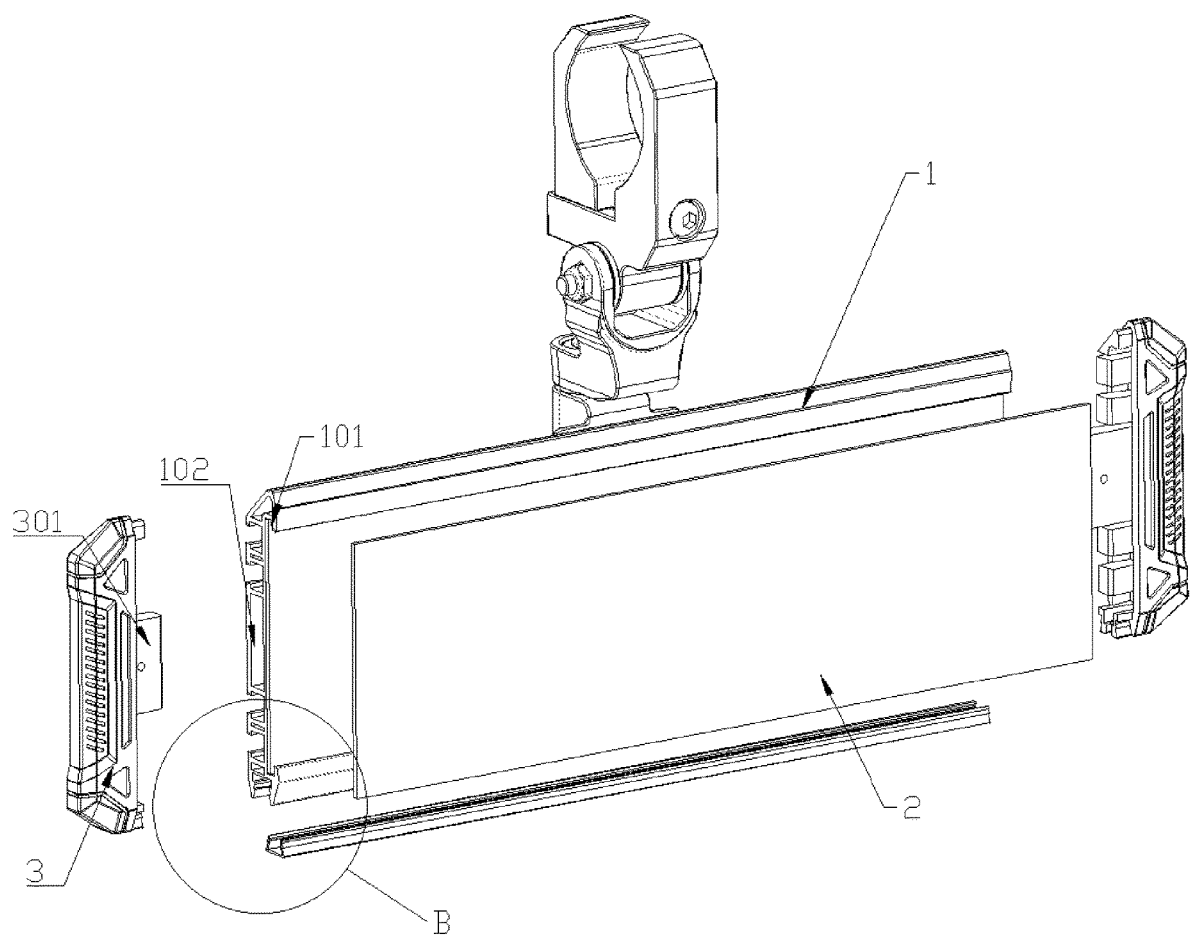
FIG. 1 is an exploded view of a central rearview mirror disclosed in an embodiment of the present disclosure.

In the figures: 1—mirror housing, 2—lens, 3—end cover, 4—first fastener, 5—pipe clamp, 6—second fastener, 7—buffer pad, 8—lampshade, 101—first sliding chute, 102—through hole, 103—second fixed hole, 104—second sliding chute, 105—third sliding chute, 106—convex strip, 301—fixed block, 302—first fixed hole, 501—connecting part, 502—third fixed hole, 601—screw, 602—nut, and 801—fastening part.

DETAILED DESCRIPTION OF THE EMBODIMENTS

The technical solutions in the embodiments of the present disclosure are clearly and completely described below by referring to the drawings in the embodiments of the present disclosure. The described embodiments are only part of the embodiments of the application, not all embodiments. Based on the embodiments in this application, all other embodiments obtained by ordinary persons skilled in the art without creative work shall fall within the scope of protection of this application.

It should be noted that the terms "first" and "second" in the specification, claims, and drawings of the present disclosure are used to distinguish similar objects and are not necessarily used to describe a specific order or priority. The data used can be interchangeable where appropriate so that the embodiments of the present disclosure described herein can be implemented in other orders than those illustrated or described here. In addition, the terms "include", "have", and any equivalents thereof in the embodiments of the present disclosure refer to non-exclusive inclusions, for example, the processes, methods, systems, products, or devices including a series of steps or units that do not necessarily list these steps or units but may include other steps or units that are not clearly listed or inherent to these processes, methods, products, or devices.

It should be understood that "center", "longitudinal direction", "transverse direction", "length", "width", "thickness", "upper", "lower", "front", "rear", "left", "right", "vertical", "horizontal", "top", "bottom", "inside", "outside", "clockwise", "anticlockwise", "axial direction", "radial direction", "circumferential direction", and other the terms indicating the orientation or position relationship are based on the orientation or position relationship shown in the drawings and only for facilitating the description of the present disclosure and simplifying the description without indicating or implying that the device or element referred to must have a specific orientation and be constructed and operated in a specific orientation, so these terms should not be a limitation to the present disclosure.

In the description of the present disclosure, the meaning of "multiple" is at least two, such as two, three, etc., unless otherwise clearly and specifically defined. In addition, unless otherwise clearly specified and defined, the terms "installed", "connection" and "connected" should be understood in a broad sense. For example, a connection may be a fixed connection, a detachable connection, or an integral connection. It may be a mechanical connection or an electrical connection. It may be a direct connection, an indirect connection through an intermediate medium, or communication between two components. For ordinary persons skilled in the art, the specific meaning of the above terms in the present disclosure can be understood in specific conditions.

In the present disclosure, unless otherwise clearly specified and defined, the first feature being above/over/on or below/under/underneath the second feature means that the first and second features may be in direct or indirect contact through an intermediate medium. Moreover, the first feature being "above/on/over" the second feature means that the first feature is directly above or obliquely above the second feature, or only indicates that the level of the first feature is higher than that of the second feature. The first feature being "under/below/underneath" the second feature means that the first feature is directly below or obliquely below the second feature or only indicates that the level of the first feature is lower than that of the second feature.

Figure 2:
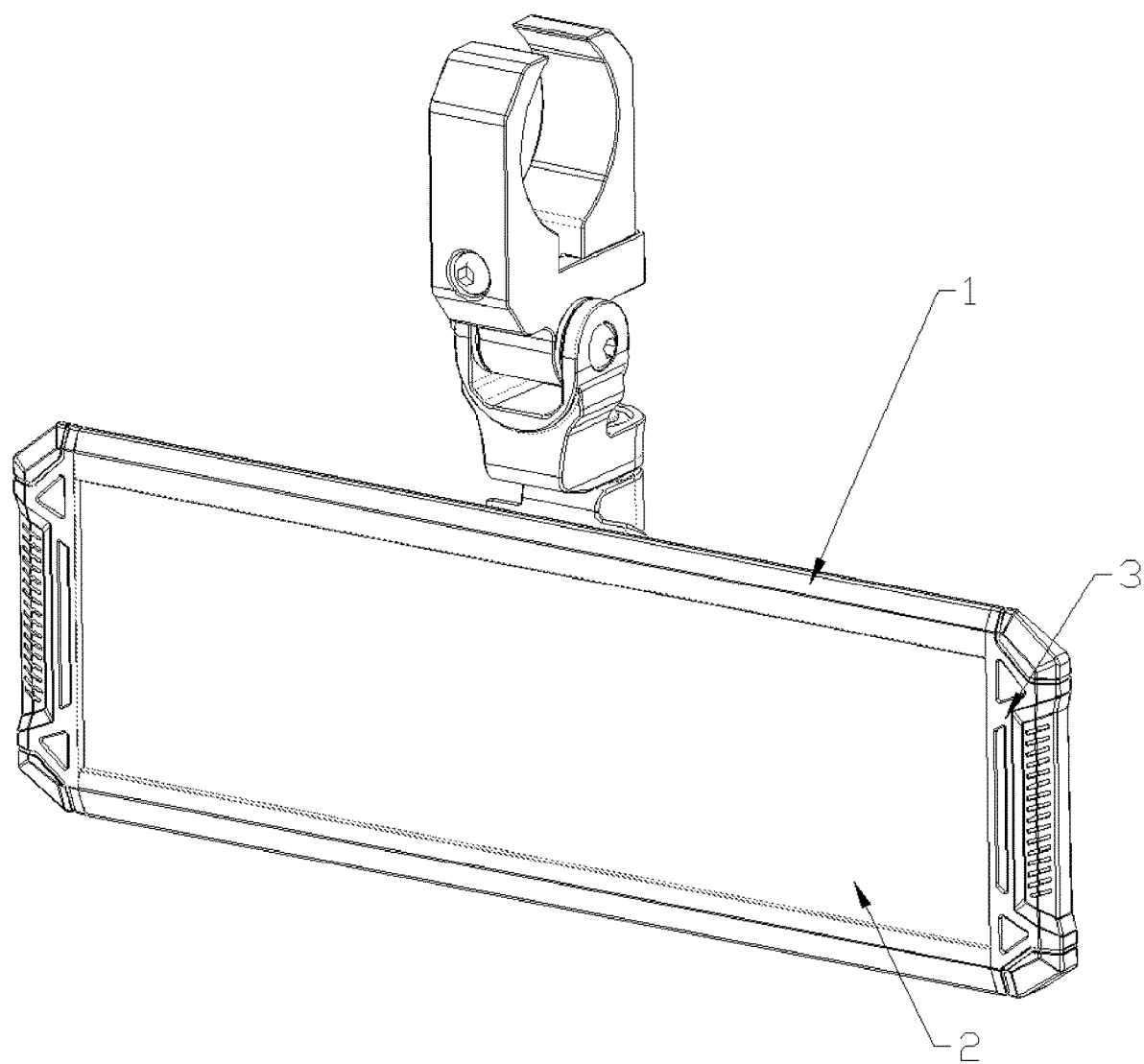
FIG. 2 is a perspective view of the central rearview mirror disclosed in an embodiment of the present disclosure.

This embodiment provides a central rearview mirror as shown in FIG. 1. The central rearview mirror includes the profile-shaped mirror housing 1. The front of the mirror housing 1 is provided with the first sliding chute 101, and the lens 2 is slidably embedded in the first sliding chute 101. The end cover 3 is removably installed at each of the two side ends of the mirror housing 1 and is configured to restrict the lens 2 in the first sliding chute 101 to prevent the lens 2 from detaching from the first sliding chute 101. The installed central rearview mirror is shown in FIG. 2. The material of the mirror housing 1 can be selected from a material, such as brushed aluminum profile, which has sufficient hardness to avoid deformation of the mirror housing 1 to protect the lens 2.

In the present embodiment, the profile is configured as the main body of the mirror housing 1, that is, the mirror housing 1 is a solid straight bar with a certain cross-section shape so that each cross-section of the mirror housing 1 is unified. When it is required to design central rearview mirrors of different lengths, it is only necessary to cut a large-length profile to obtain the mirror housing 1 in the required length. Subsequently, the mirror housing 1 is equipped with the lens 2 of the same length and the same end covers 3 so that the central rearview mirror of the required length can be obtained without tedious CNC processing or new mould-opening, thus reducing the production cost of the central rearview mirror.

For strengthening the bonding tightness between the end cover 3 and the mirror housing 1, in an example and as shown in FIG. 1, at least one through hole 102 is arranged at a side end of the mirror housing 1, that is, the through hole 102 runs laterally along the length direction of the mirror housing 1. The through hole 102 can be obtained by the extrusion of a rolling mill during the manufacture of the profile, thus eliminating the cutting or stamping process. A side end of the end cover 3 is provided with the fixed block 301 configured to be inserted into the through hole 102, and the fixed block 301 is integrated with the end cover 3. The cross-section size of the fixed block 301 is similar to the cross-section size of the through hole 102. Specifically, the fixed block 301 is in transition or interference fit with the through hole 102. After the fixed block 301 is inserted into the through hole 102, the static friction between the fixed block 301 and the through hole 102 makes it difficult for the end cover 3 to detach from the side end of the mirror housing 1.

Figure 3:
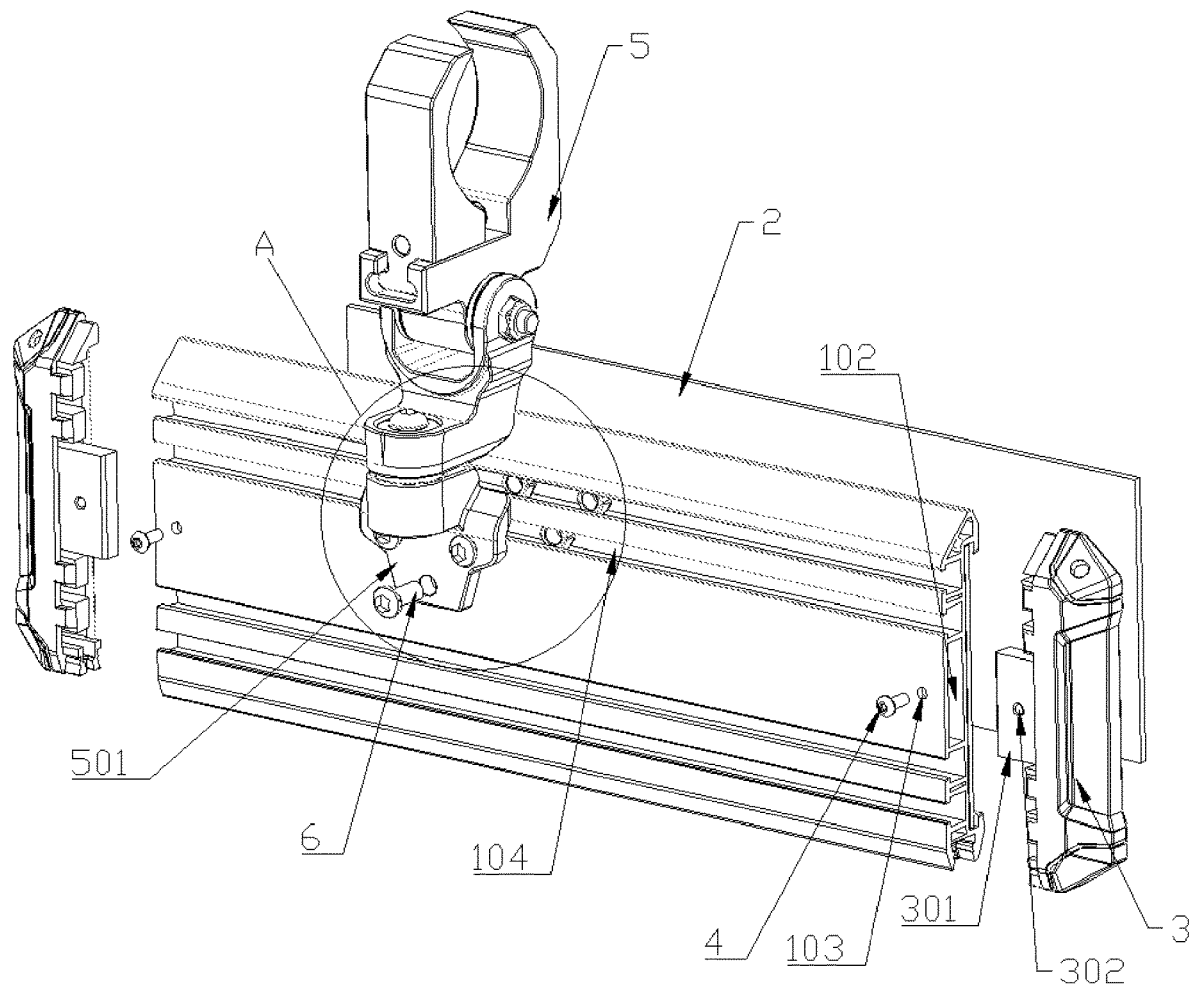
FIG. 3 is an exploded view from another angle of the central rearview mirror disclosed in an embodiment of the present disclosure.

For further fixing the end cover 3 and the mirror housing 1, in a preferred solution and as shown in FIG. 3, the surface of the fixed block 301 is provided with the first fixed hole 302, and the back of the mirror housing 1 is provided with the second fixed hole 103 overlapped with the first fixed hole 302. After the fixed block 301 is inserted into the through hole 102, the first fixed hole 302 and the second fixed hole 103 are removably locked by the first fastener 4. The first fastener 4 is configured to fix the first fixed hole 302 and the second fixed hole 103 and can be selected from a bolt or a screw.

As another preferred embodiment of the present disclosure, as shown in FIG. 3, the central rearview mirror further includes the pipe clamp 5. An end of the pipe clamp 5 is fixed with the connecting part 501, and the connecting part 501 can be either the original structure of the pipe clamp 5 or the subsequently-installed structure. At least one removable second fastener 6 is arranged on the surface of the connecting part 501. At least one second sliding chute 104 is arranged on the back of the mirror housing 1, and the second fastener 6 is slidably embedded in the second sliding chute 104. The second fastener 6 is restricted in the second sliding chute 104 by the end covers 3. In order to prevent the second fastener 6 from sliding in the second sliding chute 104, the second fastener 6 can provide a radial pressing force, and the connecting part 501 is fixed at a certain position in the second sliding chute 104 according to the expectation of a user. In this solution, the second sliding chute 104 is arranged on the back of the mirror housing 1 according to the characteristics of the profile, and the second sliding chute 104 is configured as the fixed groove of the pipe clamp 5 to adapt to a variety of pipe clamp structures carried by different vehicles.

Figure 4:
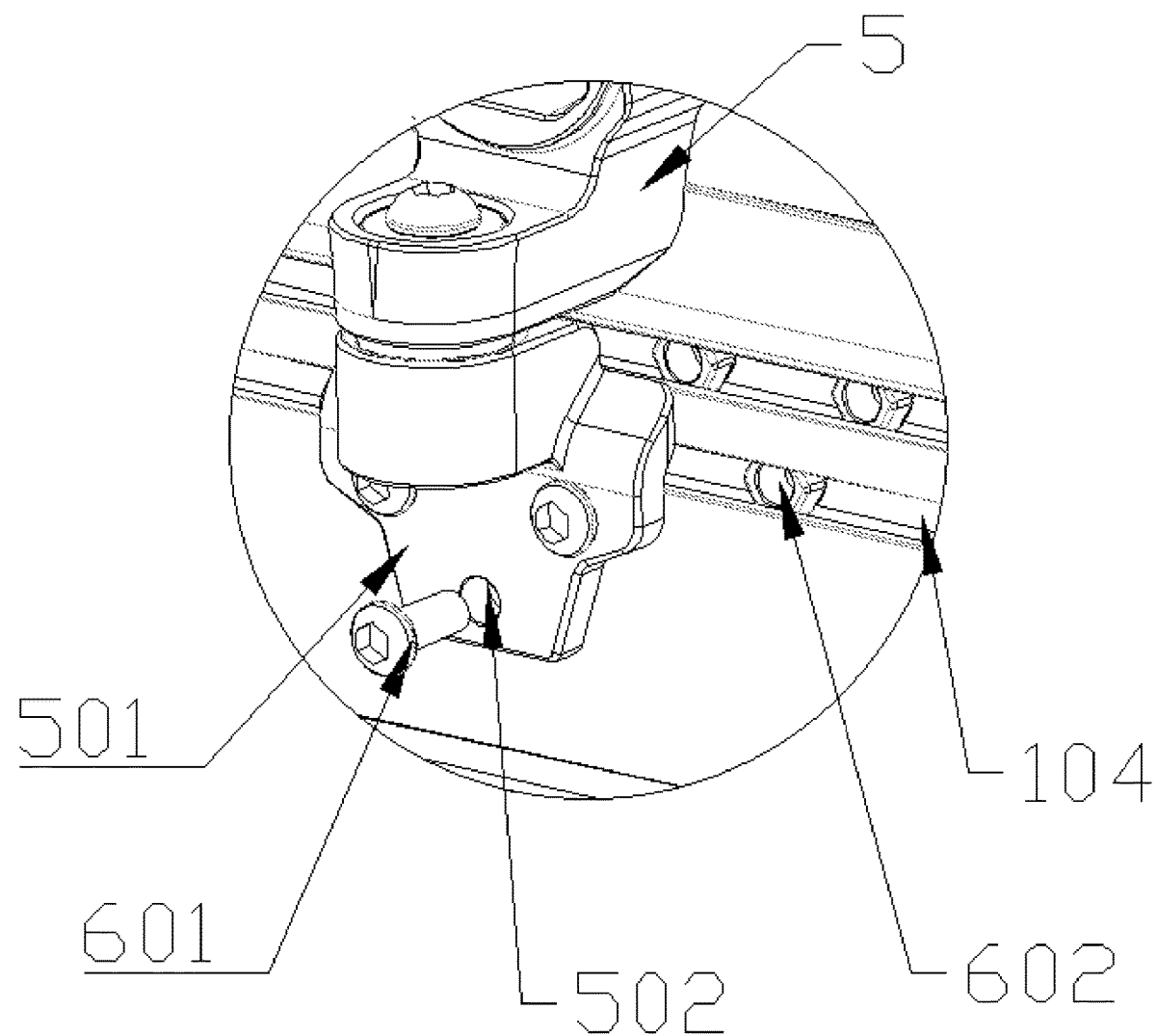
FIG. 4 is a partially enlarged view of an area in circle A in FIG. 3.

The second fastener 6 may be any mechanical or electronic unit capable of providing a radial pressing force, such as a spring-driven or electrically-driven telescopic member. In an example, as shown in FIG. 4, the second fastener 6 includes the screw 601 and the nut 602, and the nut 602 is slidably embedded in the second sliding chute 104. The surface of the connecting part 501 is provided with the third fixed hole 502. The screw 601 passes through the third fixed hole 502 and then is screwed with the nut 602. In this solution, the diameter of the nut 602 is slightly smaller than the inner wall width of the second sliding chute 104, and the nut 602 is configured to slide in the second sliding chute 104. Additionally, the diameter of the nut 602 is larger than the opening width of the second sliding chute 104. The nut 602 cannot detach from the surface opening of the second sliding chute 104, and the nut 602 also cannot detach from either side ends of the second sliding chute 104 due to the limitation of the end covers 3. Finally, the screw 601 passes through the third fixed hole 502 and then is screwed with the nut 602, so that the connecting part 501 and the mirror housing 1 are fixedly connected by the clamping force provided by the screw 601 and the nut 602 to avoid the sliding deviation of the mirror housing 1 during use.

Figure 5:
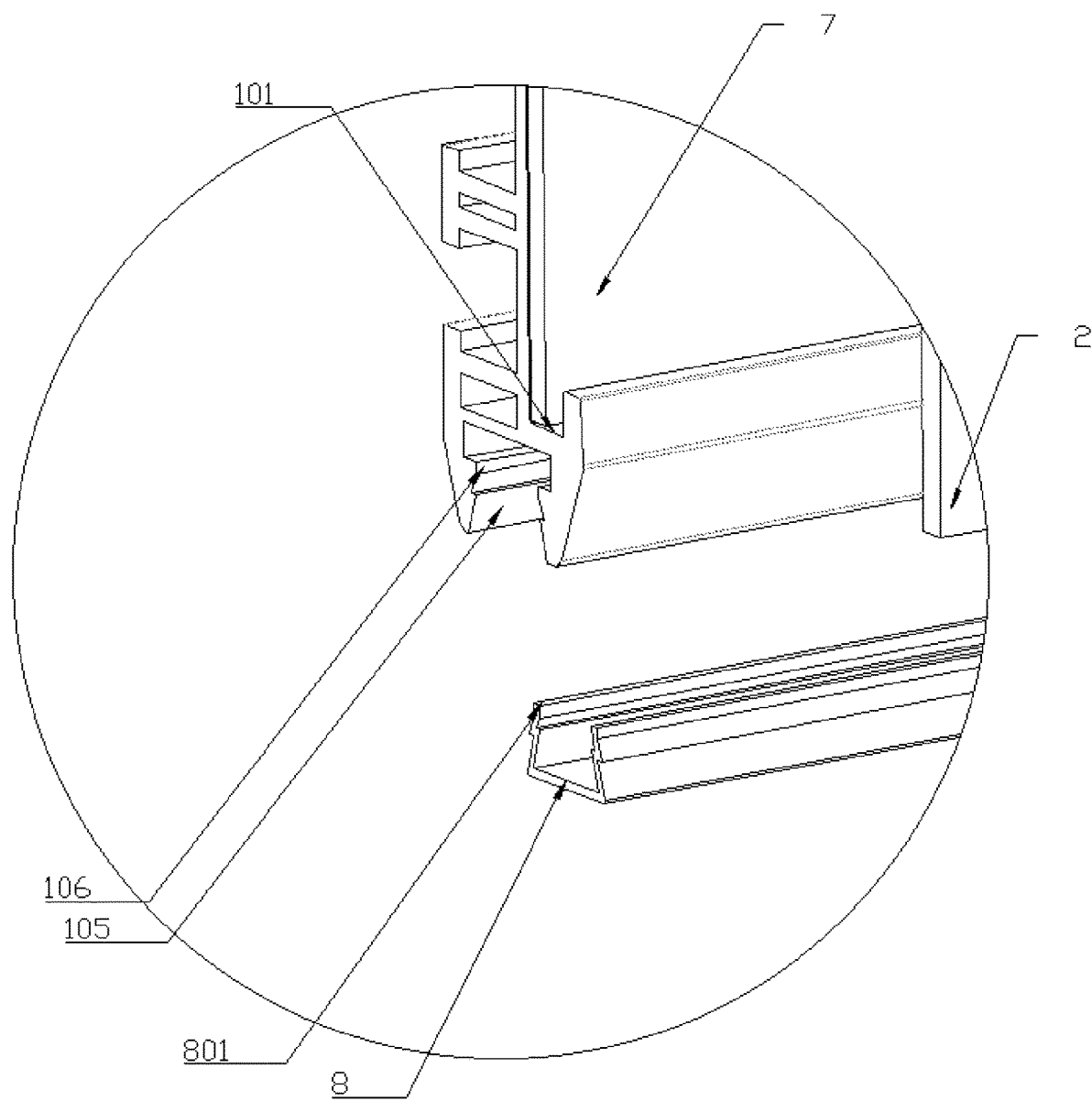
FIG. 5 is a partially enlarged view of an area in circle B in FIG. 1.

Optionally, as shown in FIG. 5, the inner wall of the first sliding chute 101 is further fixed with the buffer pad 7, and the back of the lens 2 is pressed against the front of the buffer pad 7. In this solution, the buffer pad 7 can provide a large area of buffer protection for the lens 2 to prevent the high-frequency vibration generated by the vehicle body from being transmitted directly to the lens 2 through the inner wall of the first sliding chute 101 and effectively protect the lens 2.

Optionally, as shown in FIG. 5, the bottom of the mirror housing 1 is further provided with the third sliding chute 105. A lamp strip (not shown in the figure) is slidably embedded in the third sliding chute 105, and the lamp strip can be bonded to the inner wall of the third sliding chute 105 using glue or rubberized fabric.

A more preferred solution is proposed based on the above solutions. As shown in FIG. 5, the central rearview mirror further includes the profile-shaped lampshade 8. The lampshade 8 can be made of semi-transparent plastic material, which mainly plays the role of anti-glare. In addition, the plastic material has a certain degree of elasticity, which is configured for elastic fastening between the fastening part 801 and the convex strip 106. Two long edges of the lampshade 8 are folded inward to form the fastening part 801, and the inner wall of the third sliding chute 105 is provided with the convex strip 106 matched with the fastening part 801 along the length direction of the third sliding chute 105. The fastening part 801 is slidably embedded in the third sliding chute 105 along the length direction of the convex strip 106 until the lampshade 8 shields the lamp strip, which can improve the lighting effect in the case of insufficient light.

In the description of this specification, the descriptions of the reference terms, such as "an/one embodiment", "some embodiments", "examples", "specific examples", and "some examples" means that the specific features, structures, materials, or characteristics described in combination with the embodiment or example are included in at least one embodiment or example of the present disclosure. In this specification, the schematic descriptions of the above terms do not have to be directed to the same embodiment or example. Furthermore, the specific features, structures, materials, or characteristics described may be combined in an appropriate manner in any one or more embodiments or examples. Besides, in case of no contradiction, those skilled in the art may integrate and combine different embodiments or examples as well as the features of different embodiments or examples described in this specification.

The above embodiments are only used to illustrate the technical concept and characteristics of the present disclosure, aim to enable ordinary persons skilled in the art to understand and implement the contents of the present disclosure, and should not limit the scope of protection of the present disclosure. All equivalent changes or modifications made according to the essence of the content of the present disclosure shall fall within the scope of protection of the present disclosure.

What is claimed is:

1. A central rearview mirror, comprising a profile-shaped mirror housing, wherein a front of the mirror housing is provided with a first sliding chute, a lens is slidably embedded in the first sliding chute, and an end cover is removably installed at each of two side ends of the mirror housing;
   wherein at least one through hole is arranged at a side end of the mirror housing, and a side end of the end cover is provided with a fixed block, wherein the fixed block is configured to be inserted into the at least one through hole;
   wherein a surface of the fixed block is provided with a first fixed hole, a back of the mirror housing is provided with a second fixed hole, wherein the second fixed hole is overlapped with the first fixed hole, and the first fixed hole and the second fixed hole are removably locked by a first fastener.

2. The central rearview mirror according to claim 1, wherein the fixed block is in a transition or interference fit with the at least one through hole.

3. The central rearview mirror according to claim 1, wherein the first fastener is a bolt or a screw.

4. The central rearview mirror according to claim 1, further comprising a pipe clamp, wherein an end of the pipe clamp is fixed with a connecting part, at least one removable second fastener is arranged on a surface of the connecting part, at least one second sliding chute is arranged on a back of the mirror housing, and the at least one removable second fastener is slidably embedded in the at least one second sliding chute.

5. The central rearview mirror according to claim 4, wherein the at least one removable second fastener comprises a screw and a nut, wherein the nut is slidably embedded in the at least one second sliding chute, the surface of the connecting part is provided with a third fixed hole, and the screw passes through the third fixed hole and then is screwed with the nut.

6. The central rearview mirror according to claim 1, wherein an inner wall of the first sliding chute is further fixed with a buffer pad, and a back of the lens is pressed against a front of the buffer pad.

7. The central rearview mirror according to claim 1, further comprising a profile-shaped lampshade, wherein two long edges of the lampshade are folded inward to form a fastening part, an inner wall of a third sliding chute is provided with a convex strip, wherein the convex strip is matched with the fastening part along a length direction of the third sliding chute, and the fastening part is slidably embedded in the third sliding chute along a length direction of the convex strip until the lampshade shields the lamp strip.

* * * * *